United States Patent
Chen (10) Patent No.: US 11,445,806 B2
(45) Date of Patent: Sep. 20, 2022

(54) BACK CARRIER ADJUSTING SYSTEM

(71) Applicant: Chin-Chu Chen, Taichung (TW)

(72) Inventor: Chin-Chu Chen, Taichung (TW)

( * ) Notice: Subject to any disclaimer, the term of this patent is extended or adjusted under 35 U.S.C. 154(b) by 85 days.

(21) Appl. No.: 16/747,497

(22) Filed: Jan. 20, 2020

(65) Prior Publication Data
US 2020/0237081 A1 Jul. 30, 2020

Related U.S. Application Data

(60) Provisional application No. 62/798,486, filed on Jan. 30, 2019.

(51) Int. Cl.
*A45F 3/04* (2006.01)
*A01K 1/02* (2006.01)
*A47D 13/02* (2006.01)

(52) U.S. Cl.
CPC .............. *A45F 3/047* (2013.01); *A01K 1/029* (2013.01); *A47D 13/02* (2013.01)

(58) Field of Classification Search
CPC .... A45F 3/047; A45F 3/08; A45F 3/10; A45F 2003/045; A45F 2003/146; A45F 2003/144; A01K 1/029; A47D 13/02
USPC ........................................................ 224/627
See application file for complete search history.

(56) References Cited

U.S. PATENT DOCUMENTS

| | | | | |
|---|---|---|---|---|
| 7,152,771 | B2 * | 12/2006 | Le Gal | A45F 3/047 224/631 |
| 10,058,163 | B2 * | 8/2018 | Mather | A45F 3/047 |
| 2012/0167290 | A1 * | 7/2012 | Kovacevich | F16G 11/14 2/463 |
| 2016/0007720 | A1 * | 1/2016 | Kemp | A45F 3/047 224/627 |

FOREIGN PATENT DOCUMENTS

| | | |
|---|---|---|
| CN | 2631292 Y | 8/2004 |
| CN | 1596077 A | 3/2005 |
| CN | 200938906 Y | 8/2007 |
| CN | 206380889 U | 8/2017 |
| EP | 0405035 A1 | 1/1991 |
| EP | 0628265 A1 | 12/1994 |

* cited by examiner

*Primary Examiner* — Nathan J Newhouse
*Assistant Examiner* — Matthew T Theis
(74) *Attorney, Agent, or Firm* — CKC & Partners Co., LLC (57) ABSTRACT

A back carrier adjusting system is provided in the present disclosure. The back carrier adjusting system is applied to a back carrier, which includes a main body and a strap unit connected to the main body. The back carrier adjusting system includes a guiding unit, a sliding unit and a fastening device. The guiding unit is disposed on the strap unit. The sliding unit is connected to the main body and slidably limited in the guiding unit. The fastening device includes at least one lace and a reel mechanism operably coupled with the at least one lace. The at least one lace is connected to the sliding unit. The reel mechanism is operated to retract or release the at least one lace, which makes the sliding unit move relative to the guiding unit, in order to adjust a height of the main body relative to the strap unit.

10 Claims, 14 Drawing Sheets

BACK CARRIER ADJUSTING SYSTEM

RELATED APPLICATIONS

This application claims priority to U.S. Provisional Application Ser. No. 62/798,486, filed Jan. 30, 2019, which is herein incorporated by reference.

BACKGROUND

Technical Field

The present disclosure relates to an adjusting system. More particularly, the present disclosure relates to an adjusting system applied to a back carrier such as a backpack or a baby carrier.

Description of Related Art

The conventional back carrier, such as a backpack, can include a main body and a strap unit. The strap unit is connected to the main body, and the length of the strap unit can be adjusted to match different users.

For enhancing the comfortableness of the user, a back carrier is developed with adjustable height between the main body and the strap unit, in order to distribute the loading on the user's back. The main body of such a back carrier includes a plurality of inserting sleeves arranged at intervals at a rare portion of the main body. A limiting component is connected to the strap unit and can be inserted into one of the inserting sleeves to change the height between the main body and the strap unit.

However, the abovementioned adjustment must be finished before the user wears the back carrier. If the user feels uncomfortable when wearing the back carrier and wants to adjust the height, it needs to take off the back carrier first to adjust again, leading to an inconvenience in using the back carrier.

In this regard, how to improve the structure of the back carrier adjusting system and enhance the convenience of utilization thereof has finally become a pursuit target for vendors.

SUMMARY

A back carrier adjusting system is provided according to an embodiment of an aspect of the present disclosure. The back carrier adjusting system is applied to a back carrier which includes a main body and a strap unit. The strap unit is connected to the main body. The back carrier adjusting system includes a guiding unit, a sliding unit and a fastening device. The guiding unit is disposed on the strap unit. The sliding unit is connected to the main body and slidably limited in the guiding unit. The fastening device includes at least one lace and a reel mechanism. The at least one lace is connected to the sliding unit. The reel mechanism is operably coupled with the at least one lace. The reel mechanism is operated to retract or release the at least one lace, which makes the sliding unit move relative to the guiding unit, in order to adjust a height of the main body relative to the strap unit.

BRIEF DESCRIPTION OF THE DRAWINGS

The present disclosure can be more fully understood by reading the following detailed description of the embodiment, with reference made to the accompanying drawings as follows.

DETAILED DESCRIPTION

The examples of the present disclosure will be described below with reference to the drawings. For clear explanation, many practical details will also be explained in the following description. However, it should be understood that these practical details should not be the limitation of the present disclosure, which means that these practical details are unnecessary for some of the examples of the present disclosure. Furthermore, in order to simplify the drawings, some conventional structures and elements will be illustrated in the drawings by a simple and schematic way. The duplicated elements may be denoted by the same number or similar numbers.

Nevertheless, it should be understood that when an element (or a mechanism or a module) is "connected to", "disposed on" or "coupled with" another element, the element can be directly connected to, directly disposed on or directly coupled with another element, or the element can be indirectly connected to, indirectly disposed on or indirectly coupled with another element, which means intervening elements may be present. When it is explicated that an element is "directly connected to", "directly disposed on" or "directly coupled with" another element, it means that there are no intervening elements present. In addition, the terms, such as first, second and third, are used to describe various elements or components, and the elements or components should not be limited by the terms. Consequently, a first element or component could also be termed a second element or component. Furthermore, the combination of the element, component, mechanism or module herein is not a well-known, regular or conventional combination in this art. Thus, the conventionality of the element, component, mechanism or module cannot be used to determine that the combination can be effortlessly done by a person having ordinary skill in this art.

Figure 1:
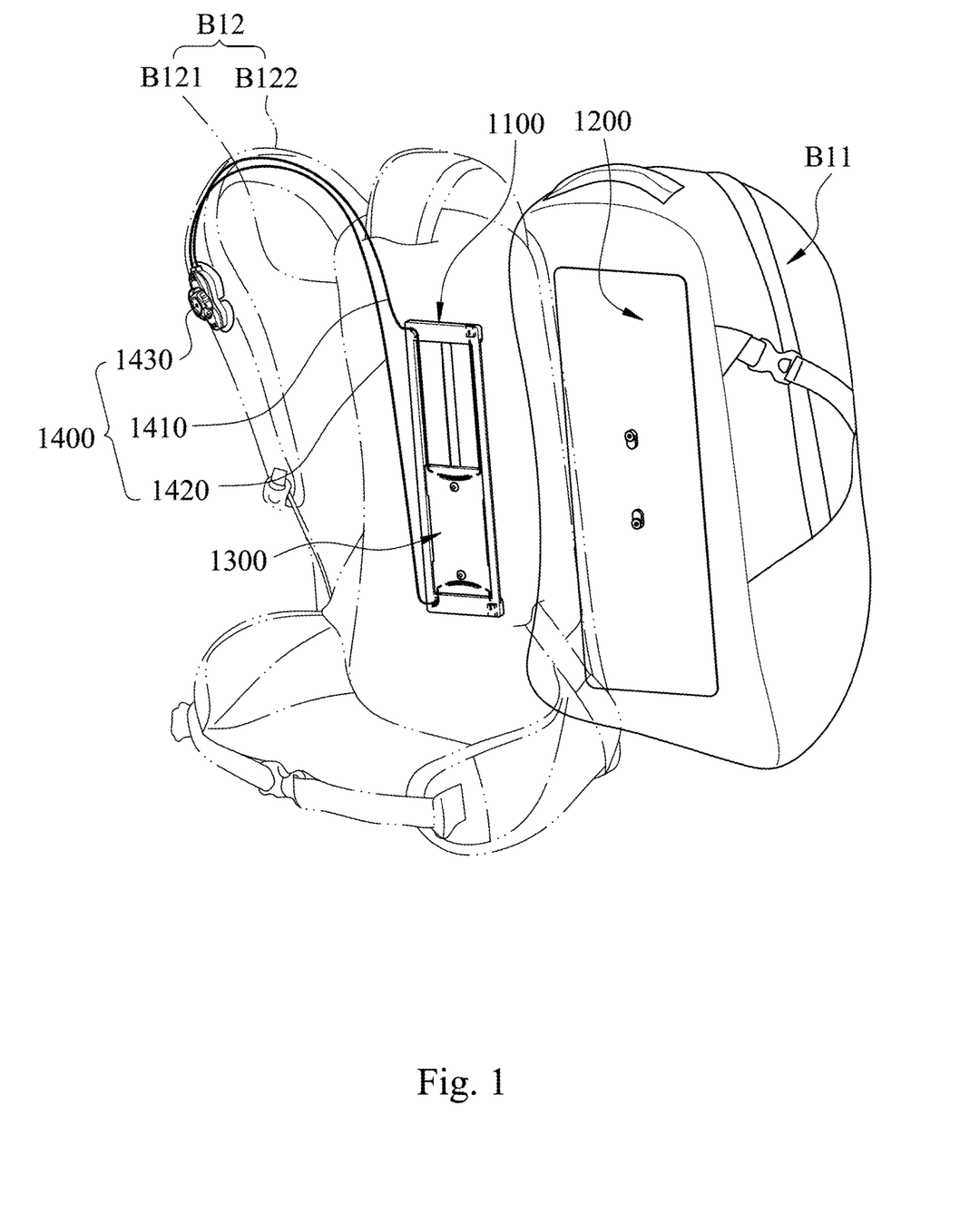
FIG. 1 is a three-dimensional explosive schematic view of a back carrier adjusting system applied to a back carrier according to a first example of the present disclosure.
Figure 2:
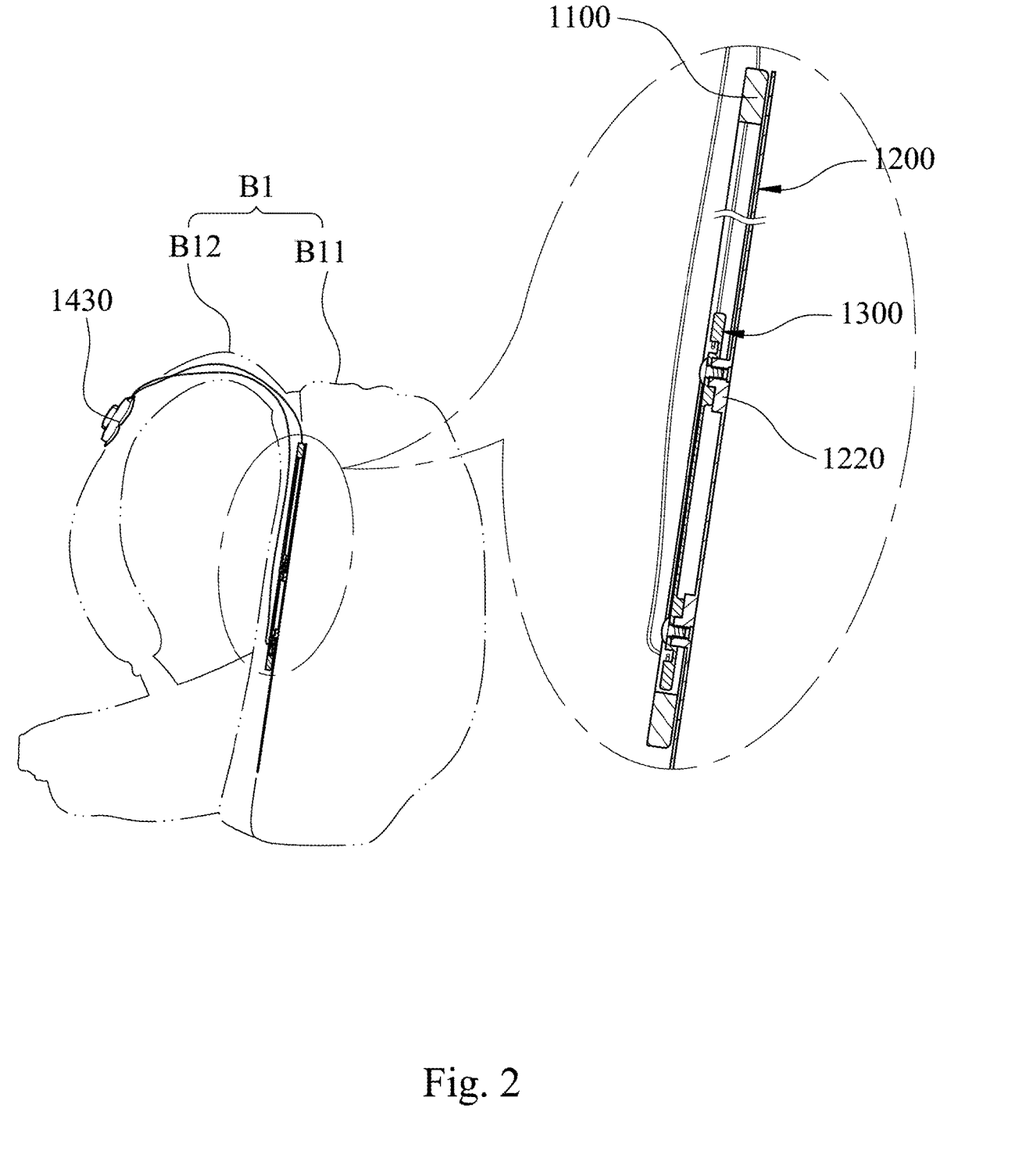
FIG. 2 is a cross-sectional schematic view of a side of the back carrier adjusting system applied to the back carrier of the first example.
Figure 3:
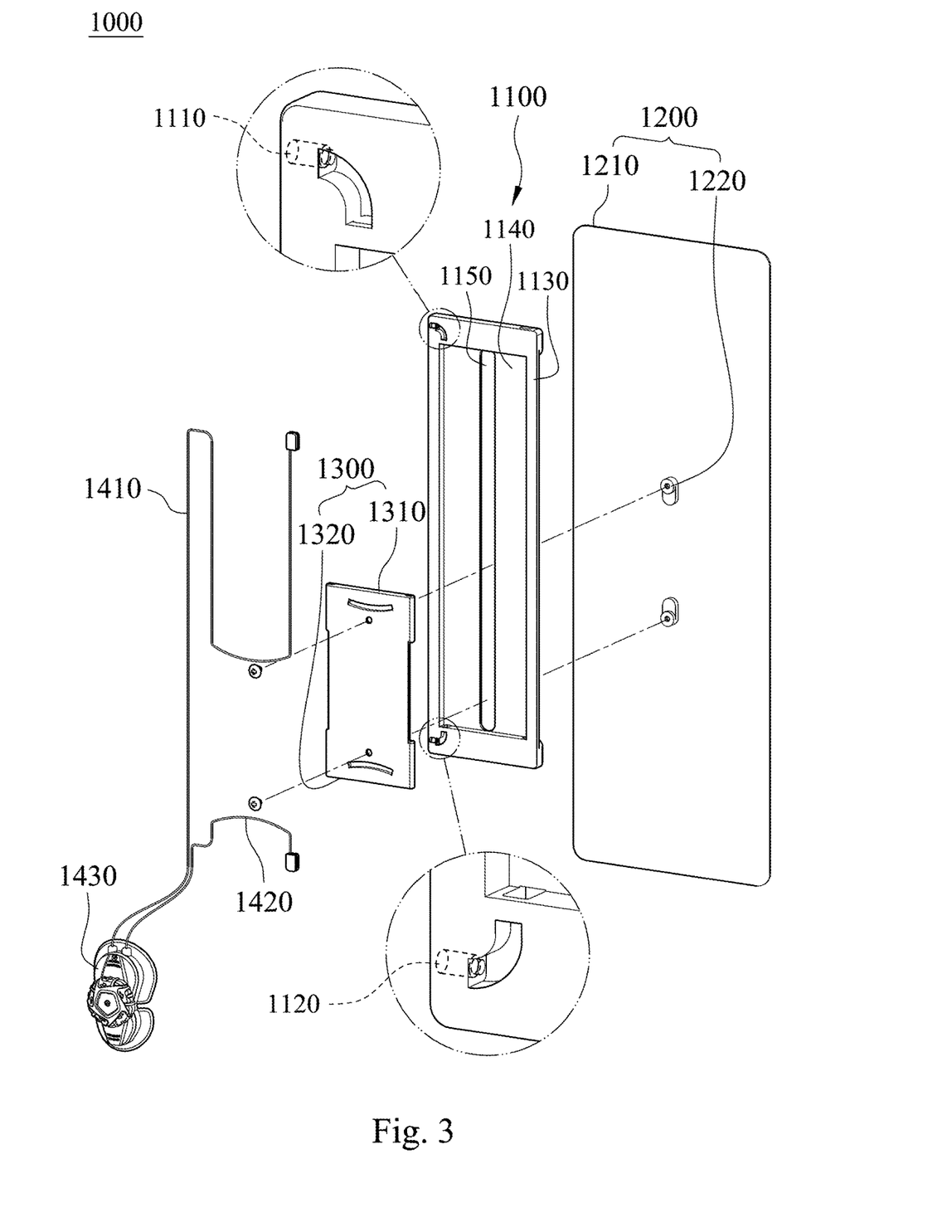
FIG. 3 is an explosive schematic view of the back carrier adjusting system of the first example.

Please refer to FIG. 1, FIG. 2 and FIG. 3. FIG. 1 is a three-dimensional explosive schematic view of a back carrier adjusting system 1000 applied to a back carrier B1 according to a first example of the present disclosure. FIG. 2 is a cross-sectional schematic view of a side of the back carrier adjusting system 1000 applied to the back carrier B1 of the first example. FIG. 3 is an explosive schematic view of the back carrier adjusting system 1000 of the first example. The back carrier adjusting system 1000 is applied to the back carrier B1 which includes a main body B11 and a strap unit B12. The strap unit B12 is connected to the main body B11. The back carrier adjusting system 1000 includes a guiding unit 1100, a sliding unit 1300 and a fastening device 1400. The guiding unit 1100 is disposed on the strap unit B12. The sliding unit 1300 is connected to the main body B11 and slidably limited in the guiding unit 1100. The fastening device 1400 includes two laces 1410 and 1420 and a reel mechanism 1430. The laces 1410 and 1420 are connected to the sliding unit 1300. The reel mechanism 1430 is operably coupled with the laces 1410 and 1420. The reel mechanism 1430 is operated to retract or release the laces 1410 and 1420, which makes the sliding unit 1300 move relative to the guiding unit 1100, in order to adjust a height of the main body B11 relative to the strap unit B12.

In this regard, the user only needs to operate the fastening device 1400 to drive the main body B11 to move relative to the strap unit B12, and thus the height is adjusted without taking off the back carrier B1, which enhances the convenience of utilization. The details and operating process of the back carrier adjusting system 1000 will be thoroughly described as follows.

In FIG. 1 and FIG. 2, the back carrier B1 is exemplified by a backpack. In other examples, the back carrier can be a baby carrier, a pet carrier, a baby carrier for hiking, etc., or includes any object which can be carried on a person's back by the strap unit. As shown in FIG. 1, the main body B11 can include a compartment for loading stuffs, and the strap unit B12 can be worn by the user to carry the main body B11 on the back. The strap unit B12 can include a back portion B121 and a strap portion B122. The back portion B121 is corresponding to the main body B11, and the strap portion B122 is connected to the back portion B121. The guiding unit 1100 and the sliding unit 1300 are disposed on the back portion B121. The reel mechanism 1430 is disposed on the strap portion B122. The laces 1410 and 1420 extend through the strap portion B122 and then into the back portion B121, in order to be coupled with the sliding unit 1300. In FIG. 1, the main body B11 and the strap unit B12 are detachably connected. In other examples, the main body and the strap unit can be partially connected and move relative to each other, in order to adjust the height of the main body relative to the strap unit.

In the first example, a number of the laces 1410 and 1420 is two. The lace 1410 is connected to a top end 1310 of the sliding unit 1300, and the lace 1420 is connected to a bottom end 1320 of the sliding unit 1300. Both of the two laces 1410 and 1420 can extend out from a top of the reel mechanism 1430, extend into the strap portion B122 and the back portion B121 sequentially, and be connected to the sliding unit 1300. Therefore, the sliding unit 1300 can smoothly slide in the guiding unit 1100. In other examples, the number of the lace can be at least one, and the lace can be connected to anywhere on the sliding unit, that is, the number of the lace and the position for the lace connected to the sliding unit can be modified according to the actual requirement, and are not limitations to the present disclosure. Optionally, in other examples, the back carrier adjusting system can further include at least one tube for the lace slidably disposed in. The tube can be disposed in the strap unit to reduce the friction between the lace and the fabric strap unit.

The guiding unit 1100 can include a guiding panel 1130, a groove-type track 1140, a first guiding hole 1110 and a second guiding hole 1120. The groove-type track 1140 is located on the guiding panel 1130 for the sliding unit 1300 slidably disposed on. The first guiding hole 1110 is located at a first end (not labeled) of the guiding panel 1130 and communicated with the groove-type track 1140. The second guiding hole 1120 is located at a second end (not labeled) of the guiding panel 1130 and communicated with the groove-type track 1140. An end of the lace 1410 extends through the first guiding hole 1110 and the top end 1310 of the sliding unit 1300, and is fixed to the guiding panel 1130. An end of the other lace 1420 extends through the second guiding hole 1120 and the bottom end 1320 of the sliding unit 1300, and is fixed to the guiding panel 1130.

Specifically, the guiding panel 1130 is mainly in a rectangular structure with recessed central part, and a relatively higher frame portion (not labeled) and the relatively lower groove-type track 1140 are formed. The thickness of the sliding unit 1300 can be equivalent to the depth of the groove-type track 1140. The width of the sliding unit 1300 can be equivalent to the width of the groove-type track 1140. The length of the sliding unit 1300 is smaller than the length of the groove-type track 1140, so as to move upwardly or downwardly in the groove-type track 1140.

The first end of the guiding panel 1130 is opposite to the second end of the guiding panel 1130. The first end of the guiding panel 1130 is adjacent to the top end 1310 of the sliding unit 1300, and the second end of the guiding panel 1130 is adjacent to the bottom end 1320 of the sliding unit 1300. The sliding unit 1300 includes two sliding channels (not labeled) respectively located at the top end 1310 and the bottom end 1320 for the laces 1410 and 1420 to extend into.

The first guiding hole 1110 and the second guiding hole 1120 are both located at the same side of the frame portion and extend therethrough. Therefore, the end of the lace 1410 can be guided by the first guiding hole 1110 into the groove-type track 1140. After passing through the sliding channel at the top end 1310 of the sliding unit 1300, the end of the lace 1410 is fixed to another side of the frame portion. Similarly, the end of the lace 1420 can be guided by the second guiding hole 1120 into the groove-type track 1140. After passing through the sliding channel at the bottom end 1320 of the sliding unit 1300, the end of the lace 1420 is fixed to another side of the frame portion.

The back carrier adjusting system 1000 can further include a connecting unit 1200, which is disposed on the main body B11 and connected to the sliding unit 1300. In other words, the sliding unit 1300 is indirectly connected to the main body B11 through the connecting unit 1200. The main body B11 and the strap unit B12 are detachably connected based on the detachable connection between the connecting unit 1200 and the sliding unit 1300. The connecting unit 1200 can include a board 1210 and at least one protruding portion 1220. The board 1210 is disposed on the main body B11. The at least one protruding portion 1220 is protruding from the board 1210 toward the guiding unit 1100, and the at least one protruding portion 1220 is for the sliding unit 1300 to be connected to. The guiding unit 1100 further includes a central slot 1150 extending through a based wall (not labeled) of the groove-type track 1140 for the at least one protruding portion 1220 to be disposed in.

The board 1210 is also mainly in a rectangular form. A number of the at least one protruding portion 1220 can be two. The protruding portions 1220 can be aligned at interval on a median line of the board 1210. Each of the protruding portions 1220 can include a female thread (not labeled). The sliding unit 1300 can be fixed on the board 1210 by two screws (not labeled). Consequently, when the sliding unit 1300 is moving in the groove-type track 1140, the protruding portions 1220 can be guided by the central slot 1150, and the connecting unit 1200 can be driven more stably.

Figure 4:
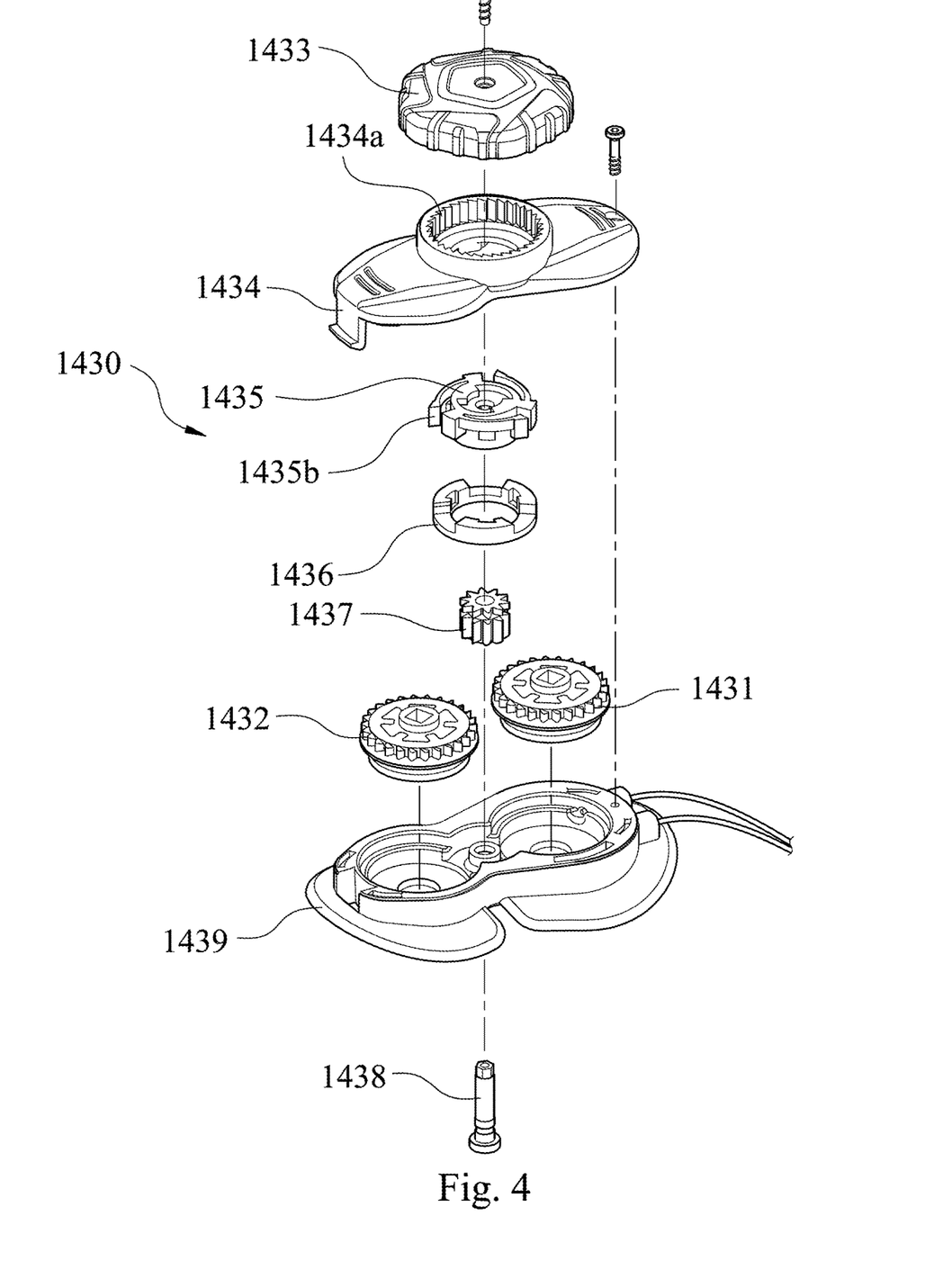
FIG. 4 is an explosive schematic view of a reel mechanism of the back carrier adjusting system of the first example.
Figure 5:
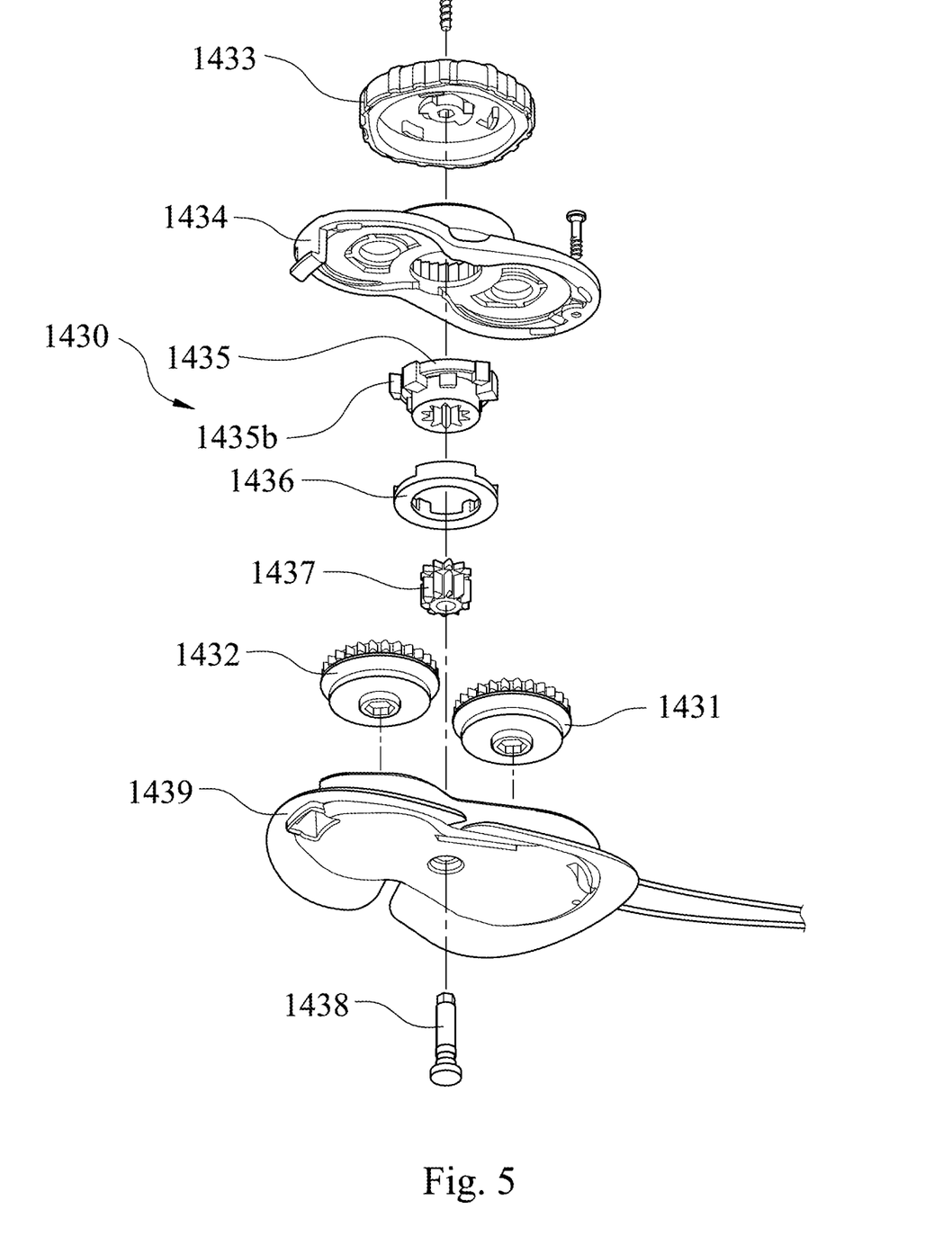
FIG. 5 is another explosive schematic view of the reel mechanism of the back carrier adjusting system of the first example.

Please refer to FIG. 4 and FIG. 5. FIG. 4 is an explosive schematic view of the reel mechanism 1430 of the back carrier adjusting system 1000 of the first example. FIG. 5 is another explosive schematic view of the reel mechanism 1430 of the back carrier adjusting system 1000 of the first example. The reel mechanism 1430 can include two spools 1431 and 1432 and a knob 1433. One of the two spools 1431 is for the lace 1410 to be wound on, and the other of the two spools 1432 is for the other lace 1420 to be wound on. The knob 1433 is operably coupled with the two spools 1431 and 1432. When the knob 1433 is twisted along a first direction R1 (shown in FIG. 7), the spool 1431 is driven to retract the lace 1410, and the other spool 1432 is driven to release the other lace 1420. Thus, the sliding smoothness of the sliding unit 1300 can be enhanced because the reel mechanism 1430 retracts the lace 1410 and release the lace 1420 at the same time.

As shown in FIG. 4 and FIG. 5, the reel mechanism 1430 can further include a covering member 1434, an engaging member 1435, a supporting member 1436, a gear 1437, a shaft 1438 and a base 1439. The spools 1431 and 1432 are disposed in the base 1439. The shaft 1438 passes through the base 1439 for the gear 1437, the supporting member 1436 and the engaging member 1435 to be assembled. The covering member 1434 is covered on the base 1439. The knob 1433 is located on the covering member 1434. The two spools 1431 and 1432 are located at two sides of the gear 1437, respectively, and thus the gear 1437 can be engaged with the two spools 1431 and 1432 at the same time.

Figure 6:
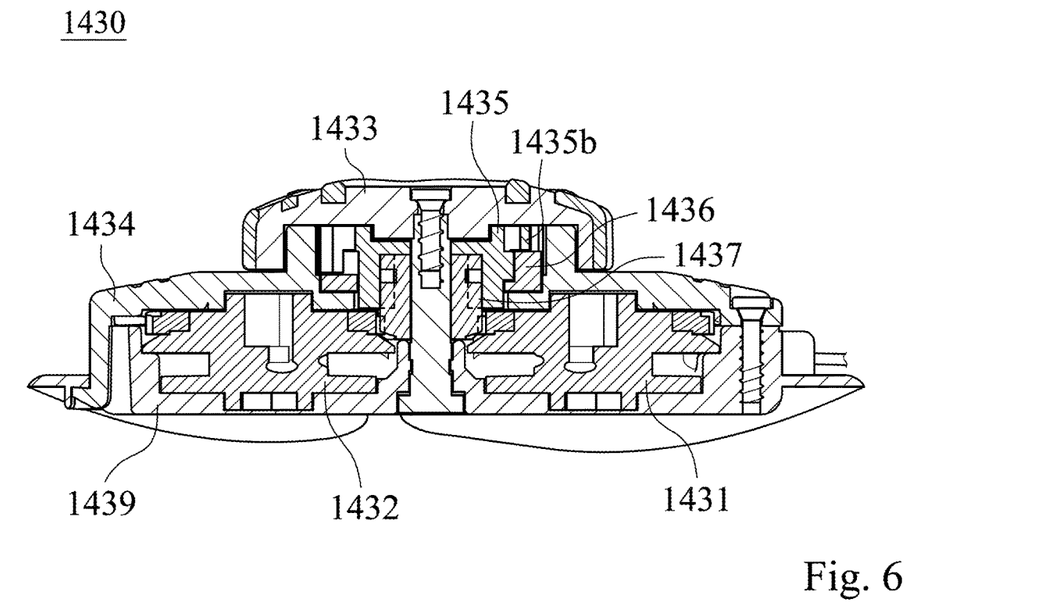
FIG. 6 is a cross-sectional schematic view of a side of the reel mechanism of the back carrier adjusting system of the first example.
Figure 7:
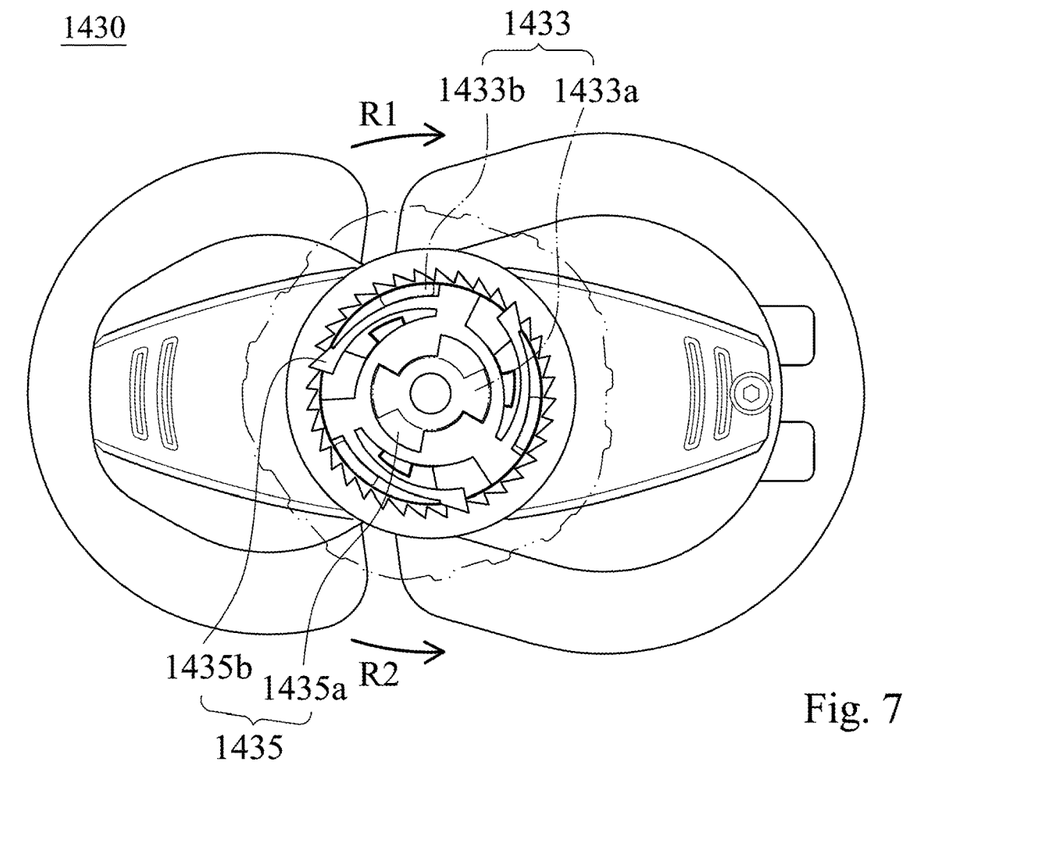
FIG. 7 is a top schematic view of the reel mechanism of the back carrier adjusting system of the first example.

Please refer to FIG. 6 and FIG. 7, as well as FIG. 4 and FIG. 5. FIG. 6 is a cross-sectional schematic view of a side of the reel mechanism 1430 of the back carrier adjusting system 1000 of the first example. FIG. 7 is a top schematic view of the reel mechanism 1430 of the back carrier adjusting system 1000 of the first example. A pushing-abutting member 1433a of the knob 1433 can be located in a cavity 1435a of the engaging member 1435. When the user applies a force to twist the knob 1433 along the first direction R1, the pushing-abutting member 1433a of the knob 1433 drives the engaging member 1435 to rotate along the first direction R1. A pawl arm 1435b of the engaging member 1435 is separated from internal teeth 1434a of the covering member 1434, so as to drive the gear 1437 to make the spools 1431 and 1432 rotate along a second direction R2 opposite to the first direction R1. In the first example, the spool 1431 can be arranged to retract the lace 1410 as rotating along the second direction R2, and the spool 1432 can be arranged to release the lace 1420 as rotating along the second direction R2. Thus, the length of the lace 1410 is shorten, which makes the sliding unit 1300 move upwardly. When the user release the knob 1433, the pawl arm 1435b of the engaging member 1435 is engaged with the internal teeth 1434a of the covering member 1434, and the length of the laces 1410 and 1420 is therefore fixed.

In contrast, when the user applies a force to twist the knob 1433 along the second direction R2, a finger portion 1433b of the knob 1433 deflects the pawl arm 1435b, and the pawl arm 1435b moves inwardly and radially to be separated from the internal teeth 1434a. The user can keep twisting the knob 1433 to retract the lace 1420. The length of the lace 1420 can be shorten, which makes the sliding unit 1300 move downwardly, in order to adjust the height between the main body B11 and the strap unit B12.

Figure 8:
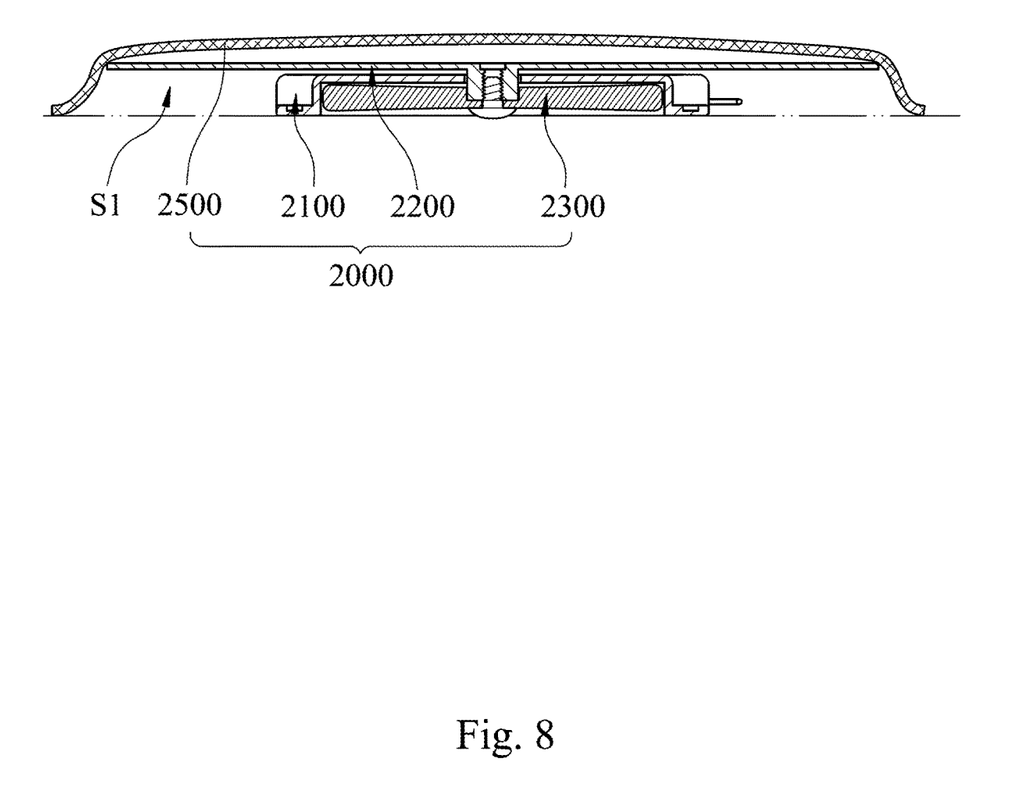
FIG. 8 is a top cross-sectional schematic view of a back carrier adjusting system according to a second example of the present disclosure.

Please refer to FIG. 8. FIG. 8 is a top cross-sectional schematic view of a back carrier adjusting system 2000 according to a second example of the present disclosure. The back carrier adjusting system 2000 further includes a fabric body 2500, which is disposed on the main body (not shown in FIG. 8). Two sides of the fabric body 2500 are respectively connected to the strap unit (not shown in FIG. 8) to form a wrapped compartment S1. The guiding unit 2100, the connecting unit 2200 and the sliding unit 2300 are located in the wrapped compartment S1. It can only be part of the board (not labeled), such as an upper portion and a lower portion, of the connecting unit 2200 connected to the main body, and a central portion of the board is not connected to the main body. The fabric body 2500 can be located between the main body and the central portion of the board, and thus the durability of the back carrier adjusting system 2000 is improved.

Figure 9:
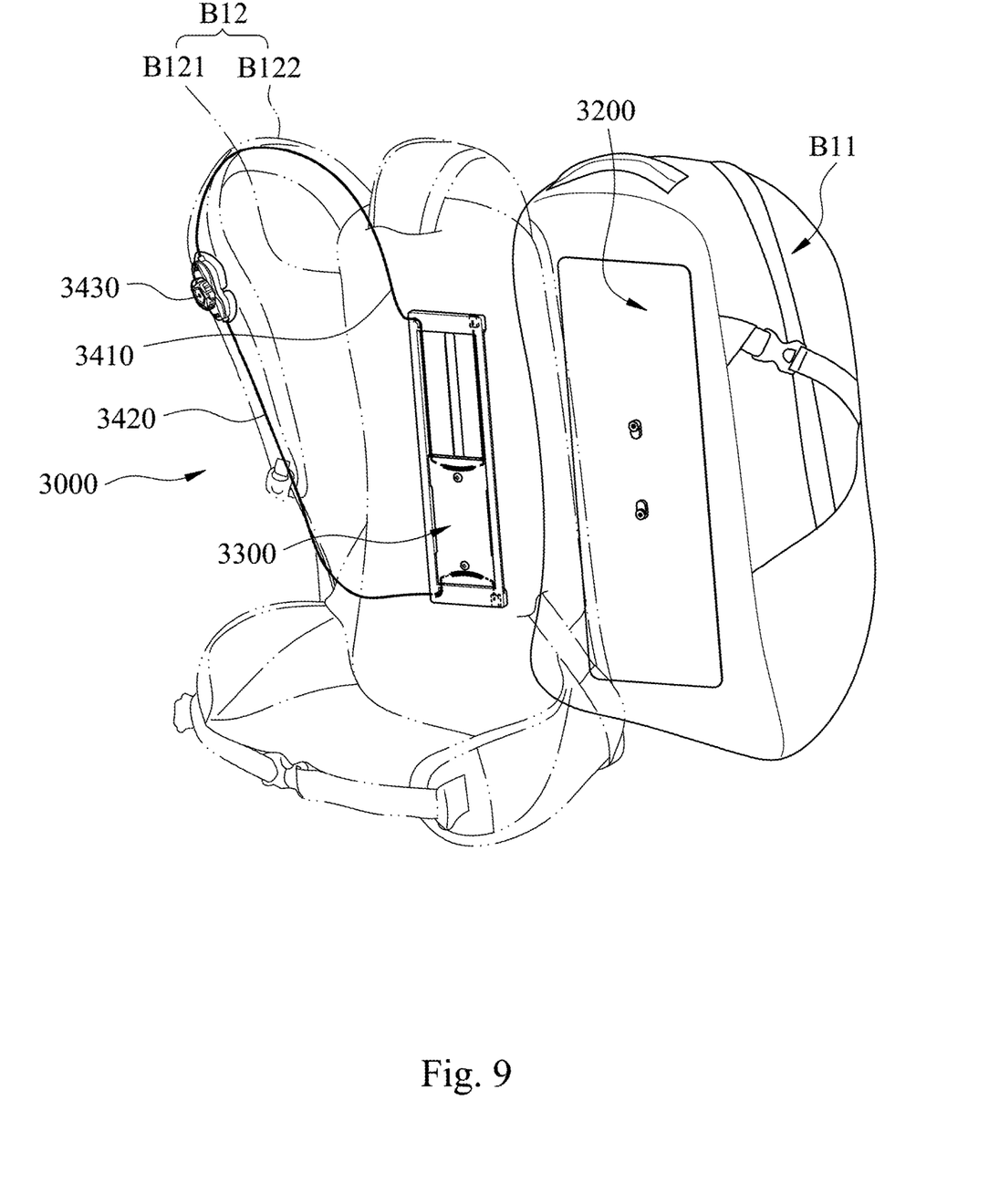
FIG. 9 is a three-dimensional explosive schematic view of a back carrier adjusting system applied to a back carrier according to a third example of the present disclosure.

Please refer to FIG. 9. FIG. 9 is a three-dimensional explosive schematic view of a back carrier adjusting system 3000 applied to a back carrier B1 according to a third example of the present disclosure. The structure of the back carrier adjusting system 3000 is similar to the back carrier adjusting system 1000 of the first example, with the difference that one lace 3410 extends out from a top of the reel mechanism 3430, and the other lace 3420 extends out from a bottom of the reel mechanism 3430. The other features, such as the connecting unit 3200 and the sliding unit 3300, which are the same as the back carrier adjusting system 1000 will not be mentioned herein.

Figure 10:
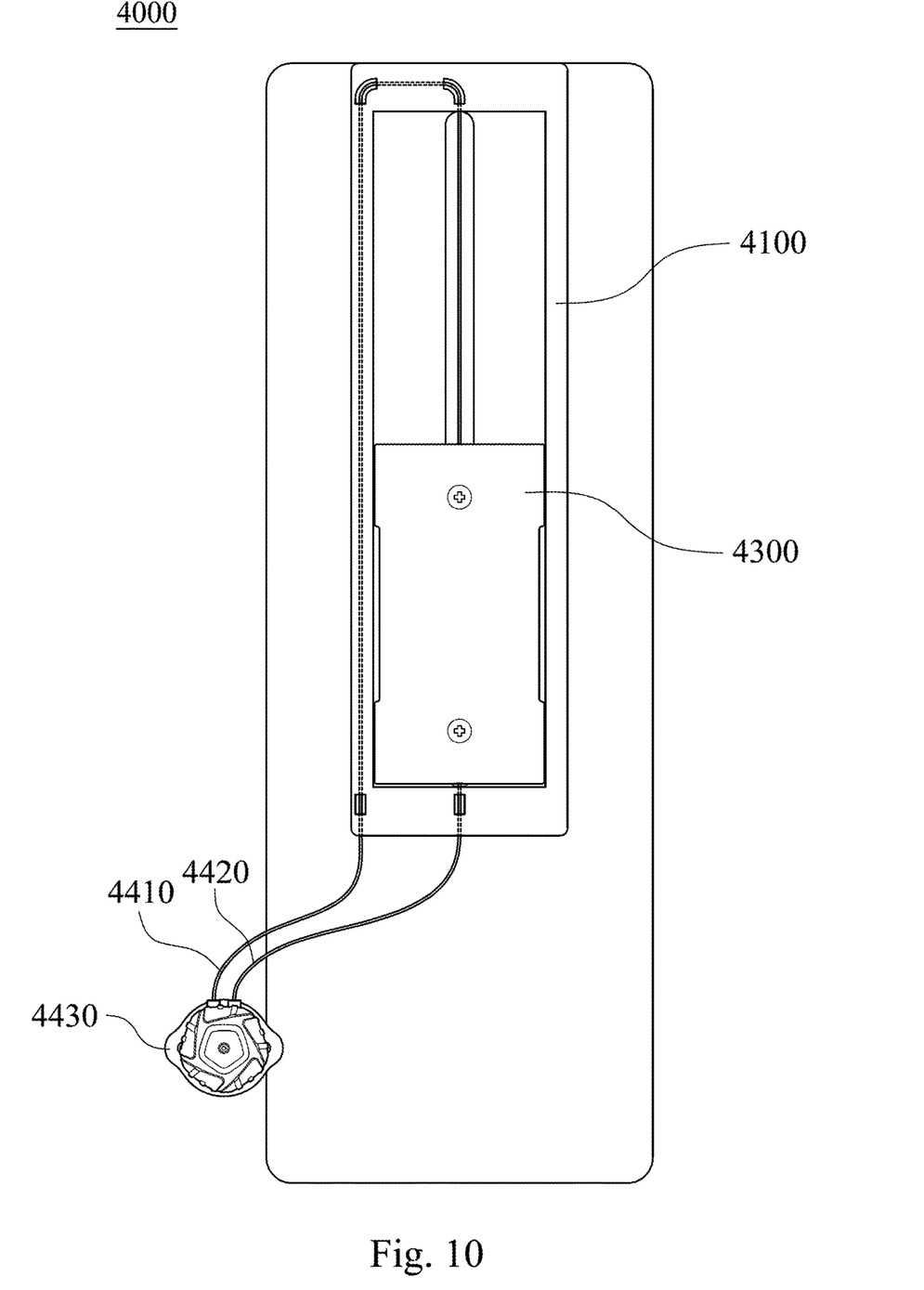
FIG. 10 is a front schematic view of a back carrier adjusting system according to a fourth example of the present disclosure.
Figure 11:
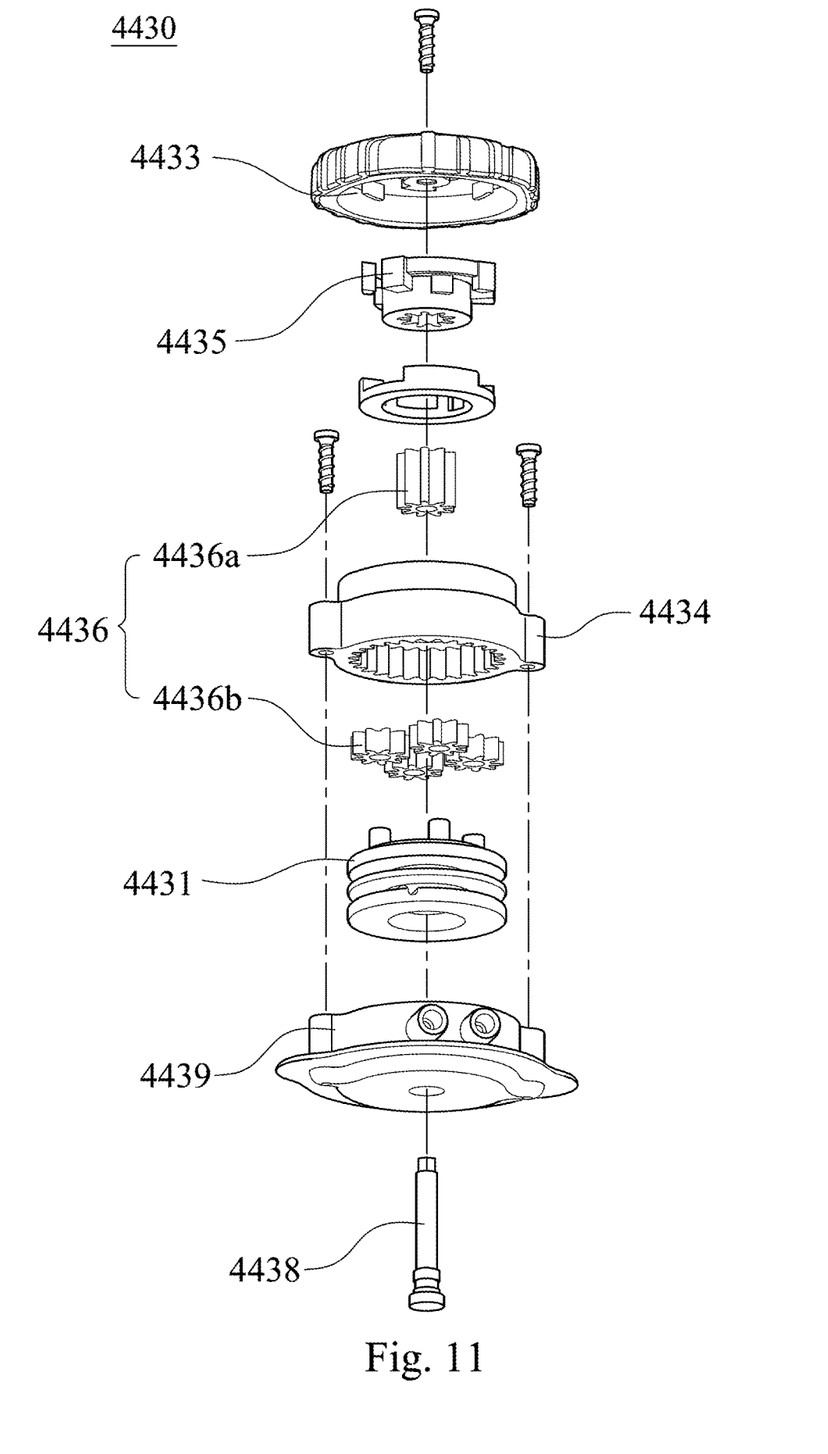
FIG. 11 is a three-dimensional explosive schematic view of a reel mechanism of the back carrier adjusting system according to the fourth example of the present disclosure.

Please refer to FIG. 10 and FIG. 11. FIG. 10 is a front schematic view of a back carrier adjusting system 4000 according to a fourth example of the present disclosure. FIG. 11 is a three-dimensional explosive schematic view of a reel mechanism 4430 of the back carrier adjusting system 4000 according to the fourth example of the present disclosure. The structure of the back carrier adjusting system 4000 is similar to the back carrier adjusting system 1000 of the first example, with the difference as follows. After entering the second end of the guiding unit 4100, the lace 4410 passes along the frame portion to the first end to be connected to the top end of the sliding unit 4300. After entering the second end of the guiding unit 4100, the lace 4420 is connected to the bottom end of the sliding unit 4300. Both of the two laces 4410 and 4420 extend out from a top of the reel mechanism 4430.

Furthermore, the reel mechanism 4430 only includes a single spool 4431. The spool 4431 includes two winding paths (not labeled) for the two laces 4410 and 4420 to be wound on, respectively. The connection and operating process of the knob 4433, the covering member 4434, the engaging member 4435, the shaft 4438 and the base 4439 are similar to the knob 1433, the covering member 1434, the engaging member 1435, the shaft 1438 and the base 1439 of the first example, and will not be mentioned herein. The reel mechanism 4430 can further include a planetary gear set 4436 which includes a sun gear 4436a and planet gears 4436b. The sun gear 4436a is engaged with the engaging member 4435, and the planet gears 4436b are pivotally disposed on the spool 4431 and engaged with the sun gear 4436a, in order to drive the spool 4431 by the engaging member 4435. The other features which are the same as the back carrier adjusting system 1000 will not be mentioned herein.

Figure 12:
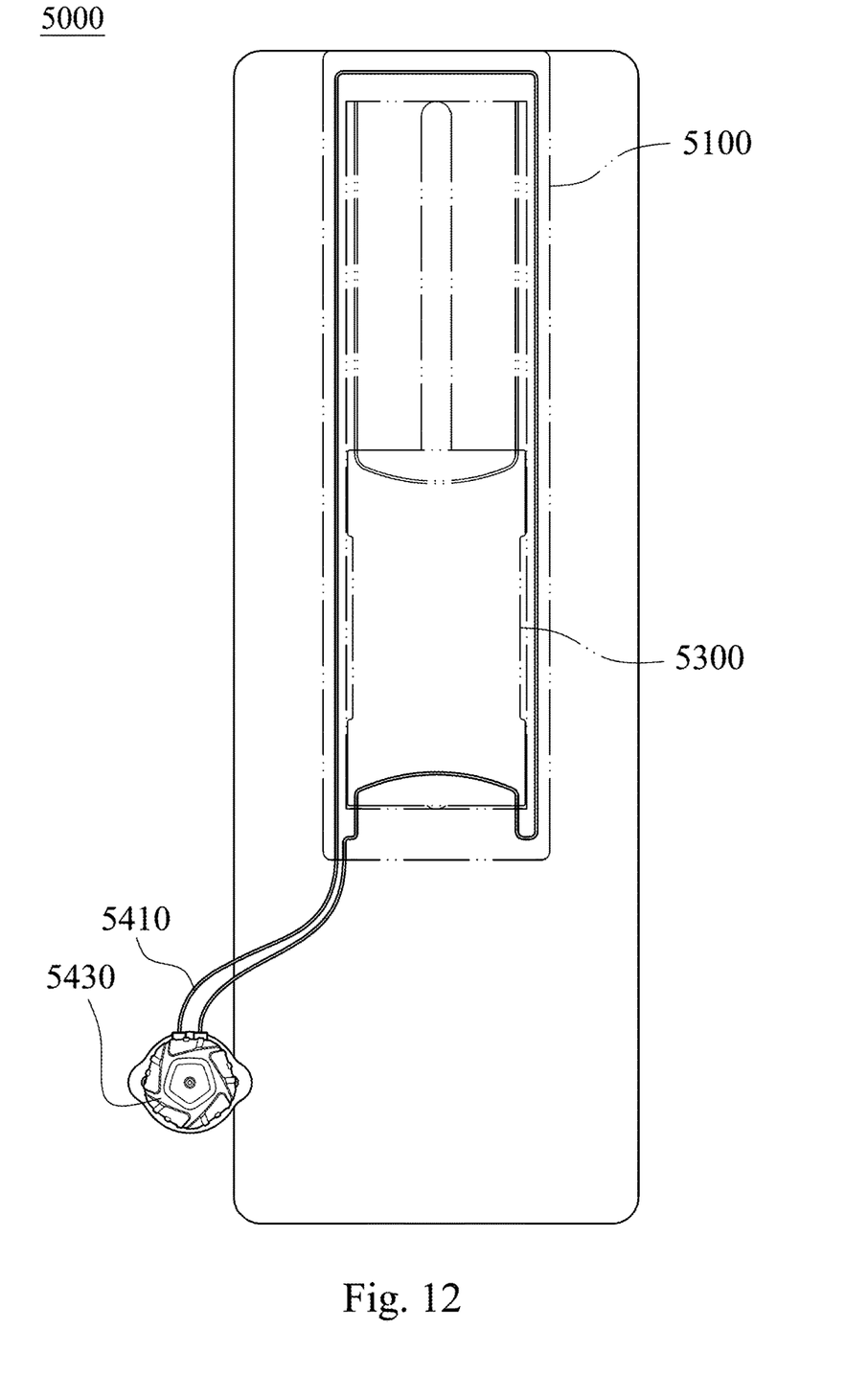
FIG. 12 is a front schematic view of a back carrier adjusting system according to a fifth example of the present disclosure.
Figure 13:
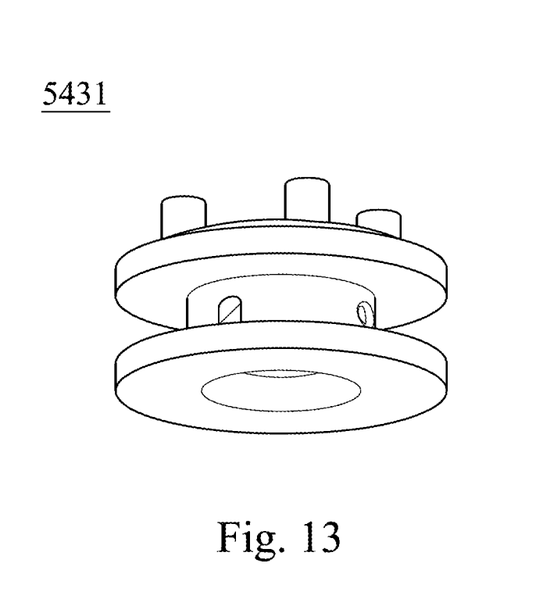
FIG. 13 is a three-dimensional schematic view of a spool of a reel mechanism of the back carrier adjusting system according to the fifth example of the present disclosure.

Please refer to FIG. 12 and FIG. 13. FIG. 12 is a front schematic view of a back carrier adjusting system 5000 according to a fifth example of the present disclosure. FIG. 13 is a three-dimensional schematic view of a spool 5431 of a reel mechanism 5430 of the back carrier adjusting system 5000 according to the fifth example of the present disclosure. The back carrier adjusting system 5000 of the fifth example is similar to the back carrier adjusting system 1000 of the first example, with the difference that the lace 5410 and the reel mechanism 5430 are different from the first example.

A number of the lace 5410 is one. An end of the lace 5410 is tied on the spool 5431 of the reel mechanism 5430. The other end of the lace 5410 passes through the first end of the guiding unit 5100 and the top end of the sliding unit 5300 sequentially. After entering the second end along the frame portion of the guiding unit 5100, the other end of the lace 5410 is connected to the bottom end of the sliding unit 5300. Finally, the other end of the lace 5410 leaves the second end of the guiding unit 5100 and returns to the spool 5431.

Therefore, the reel mechanism 5430 can only include the single spool 5431. The spool 5431 can include a single winding path for the single lace 5410 to be wound on. The other structures of the reel mechanism 5430 are similar to the reel mechanism 4430 of the fourth example, so the other structures are not illustrated in FIG. 13 and the details thereof will not be mentioned herein.

Figure 14:
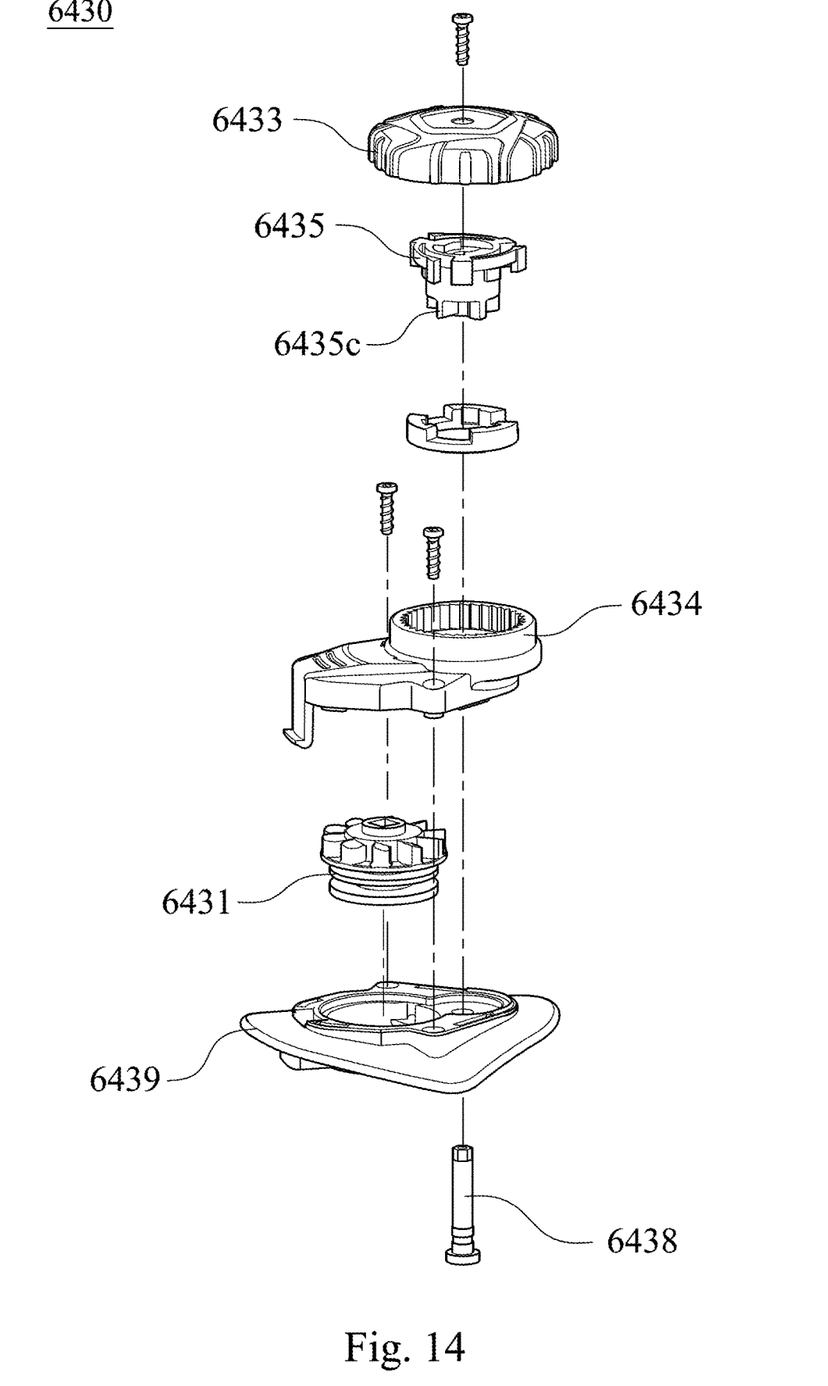
FIG. 14 is a three-dimensional explosive schematic view of a reel mechanism of a back carrier adjusting system according to a sixth example of the present disclosure.

Please refer to FIG. 14. FIG. 14 is a three-dimensional explosive schematic view of a reel mechanism 6430 of a back carrier adjusting system according to a sixth example of the present disclosure. The reel mechanism 6430 of the sixth example is similar to the reel mechanism 4430 of the fourth example. The reel mechanism 6430 only includes a single spool 6431. The spool 6431 includes two winding paths (not labeled) for the two laces to be wound on, respectively. The reel mechanism 6430 further includes the knob 6433, the covering member 6434, the engaging member 6435, the shaft 6438 and the base 6439. The structure and operating process thereof are similar to the knob 1433, the covering member 1434, the engaging member 1435, the shaft 1438 and the base 1439 of the first example. However, the spool 6431 is not set around the shaft 6438. The engaging member 6435 includes meshing teeth 6435c directly engaged with the spool 6431.

Figure 15:
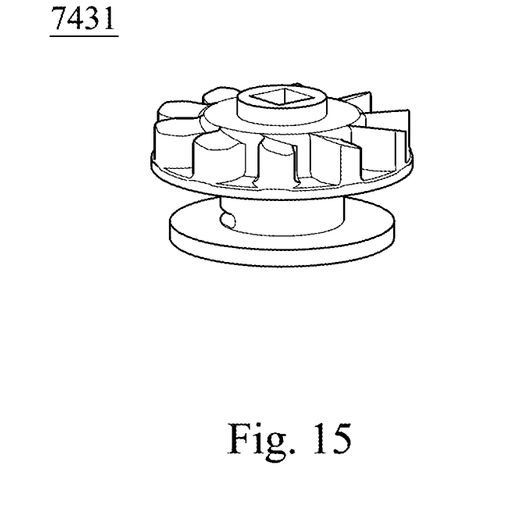
FIG. 15 is a three-dimensional schematic view of a spool of a reel mechanism of a back carrier adjusting system according to a seventh example of the present disclosure.

Please refer to FIG. 15. FIG. 15 is a three-dimensional schematic view of a spool 7431 of a reel mechanism of a back carrier adjusting system according to a seventh example of the present disclosure. The reel mechanism of the seventh example is similar to the reel mechanism 6430 of the sixth example, with the difference that the spool 7431 only includes a single winding path. The other structures which are similar to the reel mechanism 6430 are not illustrated in FIG. 15, and the details thereof will not be mentioned herein.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A back carrier adjusting system, which is applied to a back carrier, wherein the back carrier comprises a main body and a strap unit connected to the main body, and the back carrier adjusting system comprises:
   a guiding unit disposed on the strap unit;
   a sliding unit connected to the main body and slidably limited in the guiding unit; and
   a fastening device, comprising:
      two laces connected to the sliding unit; and
      a reel mechanism operably coupled with the two laces, the reel mechanism comprising two spools and a knob operably coupled with the two spools, wherein one of the two spools is for one of the two laces to be wound thereon, and the other of the two spools is for the other of the two laces to be wound thereon, the knob is twisted along a first direction to drive the one of the two spools to retract the one of the two laces, and to drive the other of the two spools to release the other of the two laces,
   which makes the sliding unit move relative to the guiding unit, in order to adjust a height of the main body relative to the strap unit.

2. The back carrier adjusting system of claim 1, further comprising:
   a connecting unit disposed on the main body and connected to the sliding unit.

3. The back carrier adjusting system of claim 2, wherein the one of the two laces is connected to a top end of the sliding unit, and the other of the two laces is connected to a bottom end of the sliding unit.

4. The back carrier adjusting system of claim 3, wherein the guiding unit comprises:
   a guiding panel;
   a groove-type track located on the guiding panel for the sliding unit slidably disposed on;
   a first guiding hole located at a first end of the guiding panel and communicated with the groove-type track; and
   a second guiding hole located at a second end of the guiding panel and communicated with the groove-type track;
   wherein an end of the one of the two laces extends through the first guiding hole and the top end of the sliding unit, and is fixed to the guiding panel; and
   an end of the other of the two laces extends through the second guiding hole and the bottom end of the sliding unit, and is fixed to the guiding panel.

5. The back carrier adjusting system of claim 4, wherein:
   the connecting unit comprises:
      a board disposed on the main body; and
      at least one protruding portion protruding from the board toward the guiding unit, wherein the at least one protruding portion is for the sliding unit to be connected to; and the guiding unit further comprises:
  a central slot extending through a based wall of the groove-type track for the at least one protruding portion to be disposed in.

6. The back carrier adjusting system of claim 2, further comprising:
  two tubes for the two laces slidably disposed in.

7. The back carrier adjusting system of claim 2, further comprising:
  a fabric body disposed on the main body, wherein two sides of the fabric body are respectively connected to the strap unit to form a wrapped compartment;
  wherein the guiding unit, the connecting unit and the sliding unit are located in the wrapped compartment.

8. The back carrier adjusting system of claim 2, wherein the strap unit comprises:
  a back portion corresponding to the main body; and
  a strap portion connected to the back portion;
  wherein the guiding unit and the sliding unit are disposed on the back portion, the reel mechanism is disposed on the strap portion, and the two laces extend through the strap portion and then into the back portion, in order to be coupled with the sliding unit.

9. The back carrier adjusting system of claim 8, wherein the one of the two laces extends out from a top of the reel mechanism, and the other of the two laces extends out from a bottom of the reel mechanism.

10. The back carrier adjusting system of claim 8, wherein both of the two laces extend out from a top of the reel mechanism.

* * * * *